Aug. 24, 1943.   J. H. ABRAMSON ET AL   2,327,616
GROUND ROD PUSHER
Filed March 4, 1940   2 Sheets-Sheet 1
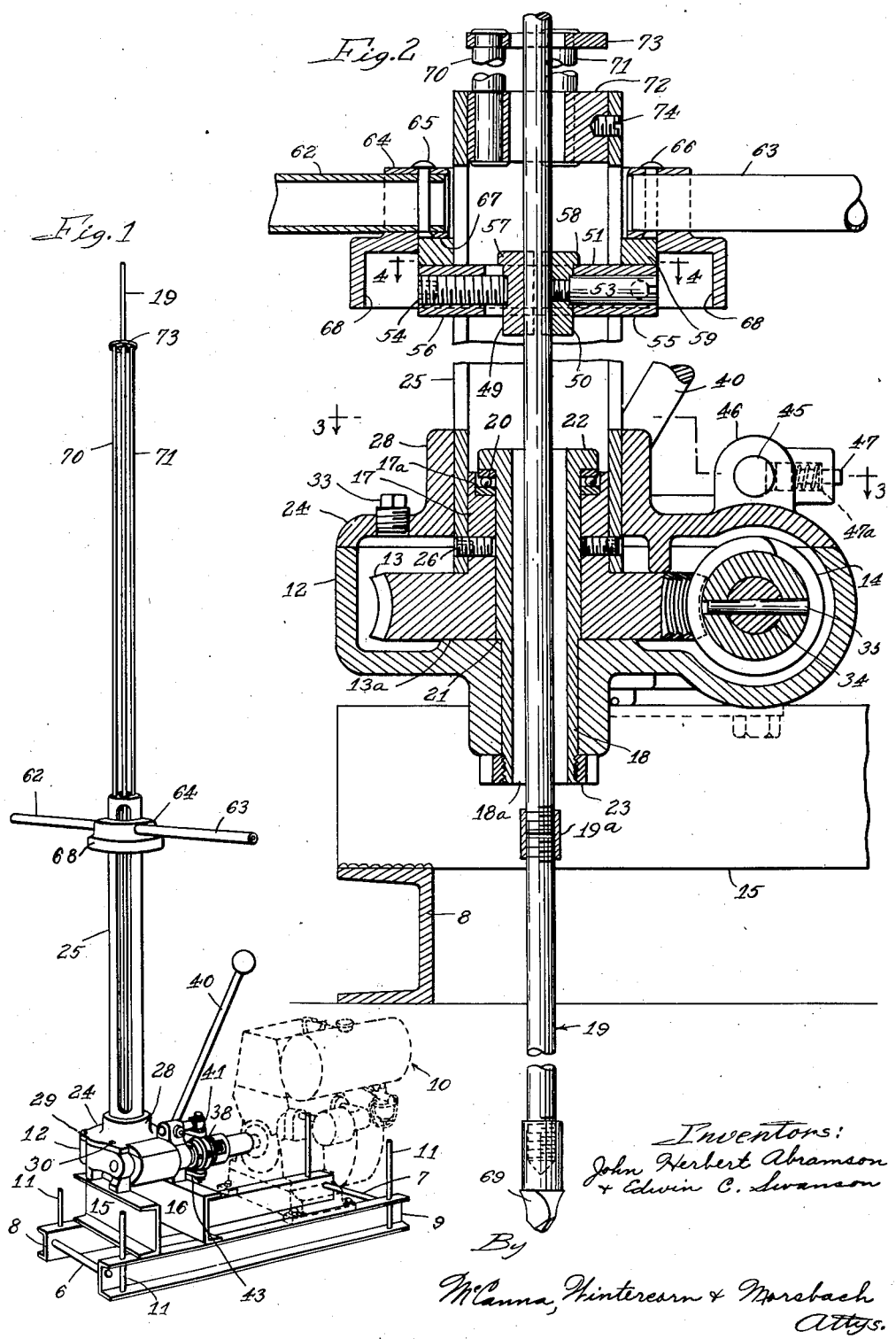
Inventors:
John Herbert Abramson
+ Edwin C. Swanson
By
McCanna, Wintercorn + Morsbach
Attys.

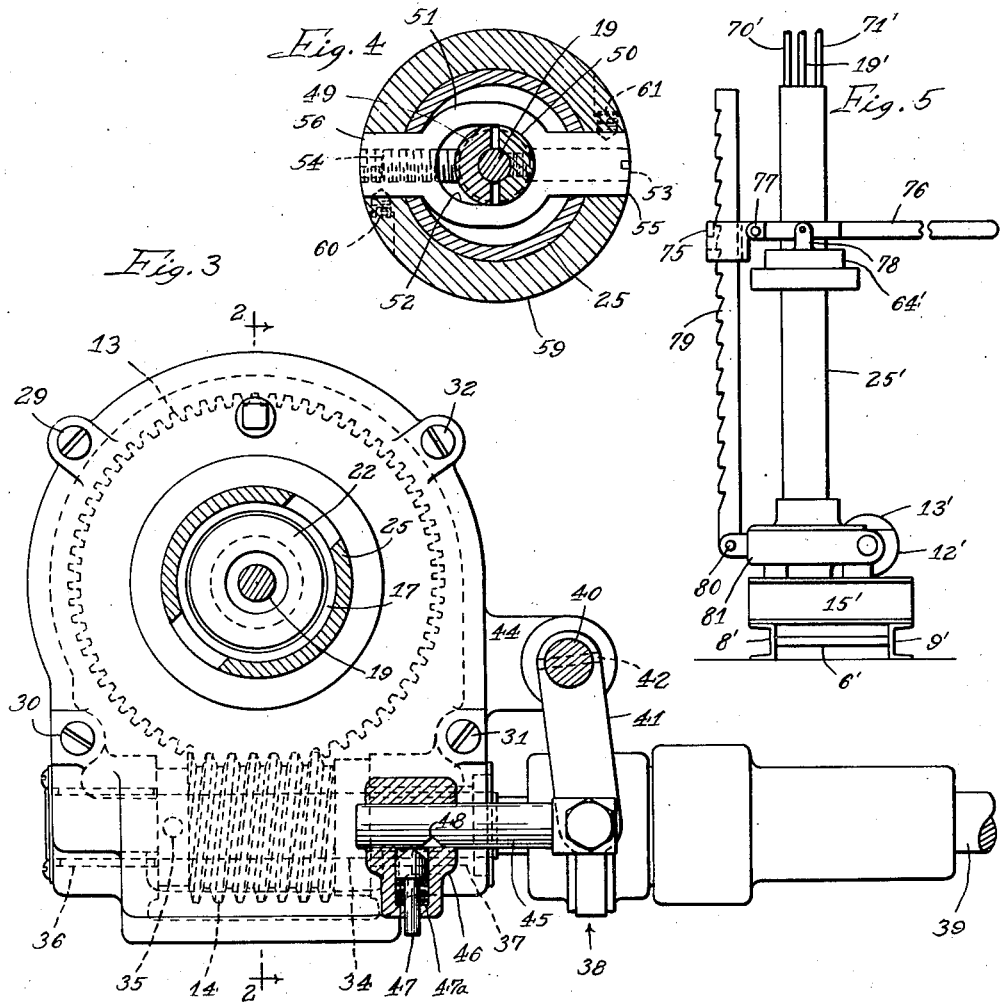

Patented Aug. 24, 1943

2,327,616

UNITED STATES PATENT OFFICE 2,327,616

GROUND ROD PUSHER

John Herbert Abramson and Edwin C. Swanson, Rockford, Ill., assignors to Greenlee Bros. & Co., Rockford, Ill., a corporation of Illinois Application March 4, 1940, Serial No. 322,160

4 Claims. (Cl. 255—22)

This invention relates to improvements in rod pushing devices more particularly adapted for the installation of ground rods such as are used for making ground connections for radio towers, lightning arresters, electric light poles, high tension towers, or any other part of an electrical distributing system.

In the past it has been customary to install ground rods for these purposes by an exclusively manually operated device through which a ground rod is driven into the ground by a series of hammer-like blows on a chuck device fitted to the ground rod or on the top of the ground rod itself. Frequently an air hammer has been used to direct blows against the end of the rod, the operator being perched in a precarious position on a pole and the long rod whipping violently at each blow. This was a dangerous and inefficient operation. Furthermore, the conductivity necessary for effectively grounding the various parts of an electrical distributing system or lightning arresting system is of such an amount as to require reaching a depth at which there is water. For this reason it is sometimes necessary to reach depths of 80 to 90 feet in order to obtain the required conductivity which has been impossible by prior art methods. Sometimes very obstructive earth strata is encountered in installing such ground rods, thereby increasing the difficulties of installation. These difficulties have frequently made it necessary to install a considerable number of rods, where one would suffice if it could be driven to the required depth.

It is apparent from the prior state of the art that it was not only a laborious and expensive process to install ground rods but an almost impossible task to do so at extreme depths or in difficult ground conditions.

Our invention contemplates the provision of means through which not only downward and vertical force is imparted to a ground rod, but also, and simultaneously, a rotary force to assist in urging the rod into the ground.

An object of our invention is to provide a rod driver unit requiring but a single operator and which efficiently installs ground rods to the desired depth.

Another object of the invention is to provide a ground rod pusher unit that is readily portable for cross country use and that will install ground rods to the depth necessary for the required conductivity in practically all earth conditions.

A further object is the provision of a rod driver which may be operated with greater safety, speed and precision than past devices.

Figure 1 is a perspective view of the rod pushing unit;

Fig. 2 is a longitudinal section of the rod pushing assembly;

Fig. 3 is a transverse section on the line 3—3 of Fig. 2;

Fig. 4 is a transverse section on the line 4—4 of Fig. 2, and

Fig. 5 is a side elevation of an alternative device for applying the downward and vertical force to a ground rod.

The device includes a frame composed of a pair of lateral braces 6 and 7 connecting, in parallel relation, two U beams 8 and 9. A suitable source of engine power such as a gasoline engine which is designated generally by the number 10, as illustrated in Figure 1, is mounted at one end of the framework, while the rod pushing assembly is mounted on the other. Four metal stakes, referred to generally by the number 11, are contained within suitably spaced holes in flanges of each of the U beams 8 and 9 and are driven into the ground. In this manner, the rod pushing unit is leveled and secured to the ground on which it is to be operated.

A gear housing 12, which is designed for the reception of a worm gear 13 and worm 14, is securely mounted by the bolting of its four legs to two transverse U beams 15 and 16 which are rigidly attached by a weld or some other suitable method to the U beams 8 and 9 comprising the main frame. The worm gear 13 having a hub 17 of an equal bore is placed in a horizontal position within the gear housing 12 so that its bore is centrally disposed with respect to a bore in the gear housing. A worm gear shaft 18 which is inserted through the bores of the worm gear and of the gear housing provides an axis and bearing for the rotating worm gear 13. The bore 18a of the worm gear shaft 18 is sufficiently large for the passage of a ground rod 19 and an attached coupling which is used under conditions presently to be described. A ball bearing 20 is mounted in an annular groove 17a of the worm gear hub 17, and a machined surface 13a of the gear housing 12 provides thrust bearing surfaces for the worm gear 13. When an indented ring 21 and a head 22 of the worm gear shaft 18 are drawn against the gear housing 12 and ball bearing 20, respectively, by the attachment of nut 23 to the threaded end of the worm gear shaft 18, the proper thrust bearing clearances are maintained.

A housing cover 24 completely covers the gear housing with the exception of a bore, which is concentric with the gear housing bore previously mentioned, and which is designed for the reception of a bottom end of a slotted cylinder 25. This cylinder 25 is placed over the gear hub 17 and is secured thereto in the upright position as illustrated in Figure 1 by the insertion of headless screws 26 and 27 into the cylinder 25 and the gear hub 17. A boss 28 of the housing cover 24 maintains the vertical alignment of the cylinder 25 as it rotates on an axis common to that of the worm gear 13. Bosses on the gear housing and corresponding bosses on the housing cover contain screws 29, 30, 31 and 32, which serve to secure one to the other. A plug 33 closes an opening in the housing cover 24 through which lubrication of the parts in the gear housing 12 is effected.

The worm 14, which engages the worm gear 13, is mounted on a shaft 34 and locked thereto by the insertion of a pin 35 in suitably placed holes. The gear housing 12 contains two bores with needle bearings 36 and 37 which are designed to provide bearing for the shaft 34. The shaft continues beyond the gear housing into a conventional clutch 38 which, in turn, is connected with a power shaft 39 from the engine. A clutch control lever 40 which is locked to a horizontal link 41 by a pin 42 and to a corresponding bottom link 43 in a like manner, provides the manual means for engaging and disengaging the clutch 38. The links are mounted on a fixed pivot on a projection 44 of the gear housing 12 so that when the clutch control lever 40 is moved in the proper direction, these links 41 and 43 operate the necessary parts of the clutch assembly to engage and disengage the clutch. A spring detent is provided through rod 45 which is slidably mounted within a bore of a projection 46 of the housing cover 24. When the clutch 38 is moved from engaged position, as illustrated in Fig. 3, to disengaged position, a locking wedge 47 is forced by a compression spring 47a into a corresponding indenture 48 in the rod 45, thereby preventing any inadverent engagement of the clutch.

When the clutch is engaged, power from the engine 10 is transmitted to the worm 14 which rotates worm gear 13 and the attached cylinder or sleeve 25.

The ground rod 19 which is to be installed is placed and centered within the sleeve 25 and the bore of the worm gear shaft 18. A chuck assembly for gripping the ground rod and holding it in a centered position is composed of divided halves 49 and 50 of a collet and a chuck piece 51 having an elliptical bore 52 containing the collet. A set screw 53 and an adjusting screw 54 are positioned within respective arms 55 and 56 of the chuck piece 51 which are of such size that they extend horizontally through the slots of the cylinder 25, as illustrated in Fig. 4, and are fully movable in a vertical direction therein. The ground rod 19 is clamped securely within the collet by the tightening of the adjusting screw 54. Because ground rods usually contain an outer coating of copper whose surface may be indented without decreasing its electrical conductivity, the surface of the ground rod is predisposed for a secure attachment to the collet.

It is usually necessary to couple several lengths of ground rod together in order to reach the depth required for the desired conductivity, and provision has therefore been made in the chuck assembly for the passage of a coupling connecting the threaded ends of two rods and indicated by the numeral 19a in Fig. 2. As the adjusting screw 54 is moved outward, collet-half 49 will slide on a flanged head 57 in the same direction within the space provided by the elliptical bore 52 of the chuck piece 51. In this loosened position, the resulting space not only permits the chuck assembly to move in a vertical direction on the ground rod 19, but also gives sufficient clearance for the passage of the coupling. The collet-half 50 is in a fixed position with respect to chuck piece 51 at all times through the insertion of the set screw 53 and the resting of a flanged head 58 on the chuck piece 51. Because of the off-center construction of the ellipse in chuck piece 51, the ground rod 19 is maintained in a centrally disposed position with respect to the cylinder 25 when the adjusting screw 54 and, consequently, the collet are in a tightened position. By virtue of the arrangement whereby the ground rod 19 is held within the chuck assembly, and the arms 55 and 56 of the chuck piece 51 extend through the slots of the cylinder 25, the rotation of the latter is transmitted through the chuck assembly to the ground rod 19 gripped therein.

A ring 59 containing a groove in a diametric relation to its bottom is slidably fitted on the cylinder 25 and is positioned above the chuck piece 51 so that the arms 55 and 56 of the chuck piece are received within this groove. The chuck piece 51 is secured within the groove of the ring 59 by the insertion of headless screws 60 and 61 into bores of the ring and received in indentures in the chuck piece 51 as shown in Figure 4.

A pair of handles 62 and 63 which are positioned on opposite sides of a pressure collar 64, provide means for applying manual downward and vertical pressure to the ground rod 19. The inner ends of these handles 62 and 63 are held within bores in the upper part of the pressure collar 64 and are secured thereto by rivets 65 and 66, respectively. As the cylinder 25 rotates and turns the chuck assembly and the ground rod 19, downward pressure from the pair of handles 62 and 63 is exerted by an annular groove 67 of the pressure collar 64 against the rotating ring 59, which, in turn, evenly distributes the pressure to the chuck assembly gripping the ground rod 19. Thus, in operation, the rotating chuck assembly and the ground rod 19 are directed in a downward and vertical direction within the cylinder 25. The pressure collar 64 contains an outer ring 68 which is a reinforcing device and which protects the operator from injury by acting as a shield for the rotating parts within. This ring 68 is of sufficient diameter to permit the insertion of an Allen wrench into the adjusting screw 54 without separating the chuck assembly from the pressure collar 64.

A drill head 69 is mounted on the threaded end of the ground rod 19 and provides a means for drilling through ground material including the more obstructive strata encountered before the necessary depth is attained. When the chuck assembly and the pressure collar 64 have traveled the length of the slots in the cylinder 25 pushing the ground rod 19 a like distance, the clutch lever 40 is actuated to disengage the clutch, and the chuck is returned to the top of the slots of the cylinder 25 by loosening the screw 54 and then retightening the same at a new position on the ground rod. This process is repeated until the desired depth of the ground rod 19 has been attained. As has been mentioned, this machine is adapted for pushing successive ground rods which are coupled together in order that depths of 80 to 90 feet, which are occasionally required, may be reached.

Previous practice has indicated that the unsupported portion of a rotating rod is disposed to whip. This not only tends to bend the rod but endangers nearby persons. To prevent whipping on the portion of the ground rod 19 that extends beyond the top of the cylinder 25, provision has been made for a stabilizing device. This consists of two rods 70 and 71 which at their lower ends are set within suitably spaced bores in a cylinder ring 72. At their other end these rods 70 and 71 are maintained in parallel relation by the attachment in the bores of a ring 73. This device is mounted to the cylinder 25 by positioning of the cylinder ring 72 in the top of the cylinder 25 where it is secured by the insertion of a screw 74. The ground rod is contained within the central opening of the ring 73 and the cylinder ring 72 and is stabilized thereby when the machine is operating.

An alternative method for applying the vertical and downward manual pressure is illustrated in Figure 5. A pawl device 75, which is pivotally attached to a handle 76 at 77 and to a bracket 78 and a corresponding opposite bracket of a pressure collar 64', operates on notches of a bar 79. The bar 79 is anchored by a pivot joint 80 to a strap 81 which is suitably mounted on the gear housing 12'. By a series of pumping strokes, the pressure collar 64' and the chuck assembly which grips the ground rod 19' can be made to travel down the length of the vertical slot in the cylinder 25'. The pawl 75 can be released and moved upwards on the cylinder along with the pressure collar 64' and the chuck assembly, in the manner previously described, where the entire assembly is reset at the start position for the repetition of this process until the desired depth of the ground rod 19' is attained.

In operation, the engine 10 provides the power for the rotation of the shaft 34 on which the worm 14 is mounted. The worm 14 is engaged with the worm gear 13 and turns the latter at a reduced speed. Rotary motion is transmitted thereby to the cylinder 25 which is mounted to the hub 17 comprising a part of the worm gear 13. As cylinder 25 rotates, it actuates the chuck assembly which grips the ground rod 19 by means of the chuck piece arms 55 and 56 which extend transversely through the longitudinal slots in the opposite sides of the cylinder 25. Simultaneously with the rotary motion imparted to the ground rod 19 by the method just described, vertical and downward pressure is applied by the operator exerting manual force on either the pair of handles 62 and 63, or by the handle 76 of the alternative construction illustrated in Figure 5. This force is transmitted through the pressure collar 64 to the rotating chuck assembly and the contained ground rod 19 pushing the latter to an initial depth corresponding to the distance the chuck assembly traveled on the cylinder 25.

It will be seen that we have thus provided a device for inserting ground rods which is both rapid and efficient in its operation which permits the driving of rods to greater depth than has heretofore been possible and which eliminates the danger heretofore associated with this operation.

While we have thus described and illustrated a specific embodiment of the invention, this is by way of illustration, and we do not wish to be limited except as required by the prior art and the scope of the appended claims, in which—

We claim:

1. The combination in a device for inserting ground rods, of means for gripping a vertically disposed cylindrical member for insertion into the ground, a sleeve for reception of said member carrying said means for rotation therewith and for free longitudinal movement with respect to the sleeve, means for rotating said sleeve, means for manually exerting pressure on said gripping means to move the same downward on said sleeve and thereby urge said member into the ground during rotation, and guiding means on the said sleeve spaced upwardly therefrom to prevent whipping of said cylindrical member during its rotation.

2. The combination in a device for inserting ground rods, of means for gripping a vertically disposed cylindrical member for insertion into the ground, a sleeve for receiving said member carrying said means for rotation therewith, means for rotating said sleeve, means to urge the said ground rod into the ground during rotation, a plurality of parallel rods extending upwardly from the top end of the said sleeve and being secured thereto to rotate therewith, collar means secured at the upper ends of the said rods encircling the said ground rod to prevent its whipping during its rotation.

3. The combination in a device for inserting ground rods, of means for gripping a vertically disposed cylindrical member for insertion into the ground, a sleeve for receiving said member and for carrying the said gripping means in a longitudinal slot for rotation therewith, means for rotating said sleeve, means for urging the said ground rod into the ground during rotation comprising a collar riding on the outside of the said sleeve and engaging the said gripping means, a substantially vertical rod pivotally secured near the bottom of the said sleeve, a ring movable in a vertical direction on the said rod, a handle pivotally secured to the said ring, the said handle also engaging the said collar to force the latter downwardly in response to pumping movements of the said handle, the said ring acting as an end fulcrum therefor.

4. The combination in a device for inserting ground rods, of means for gripping a vertically disposed cylindrical member for insertion into the ground, a sleeve for reception of said member carrying said means for rotation therewith and for free longitudinal movement with respect to the sleeve, means for rotating said sleeve, means for manually exerting pressure on said gripping means to move the same downward on said sleeve and thereby urge said member into the ground during rotation, and guiding means spaced upwardly therefrom to prevent whipping of said cylindrical member during its rotation.

JOHN HERBERT ABRAMSON.
EDWIN C. SWANSON.